(12) United States Patent
Sato et al.

(10) Patent No.: US 6,300,954 B1
(45) Date of Patent: Oct. 9, 2001

(54) METHODS AND APPARATUS FOR DETECTING LIQUID CRYSTAL DISPLAY PARAMETERS USING STOKES PARAMETERS

(75) Inventors: Susumu Sato, 7-26, Yabase-honcho 4-Chome, Akita-shi, Akita-ken (JP); Ying Zhou; Zhan He, both of Bedford Hills, NY (US); Yoshihiro Togashi, Kasugai (JP)

(73) Assignees: Meiryo Tekunika Kabushiki Kaisha; Susumu Sato, both of (JP)

( * ) Notice: Subject to any disclaimer, the term of this patent is extended or adjusted under 35 U.S.C. 154(b) by 0 days.

(21) Appl. No.: 09/151,062

(22) Filed: Sep. 10, 1998

Related U.S. Application Data

(63) Continuation-in-part of application No. 08/974,994, filed on Nov. 20, 1997, now Pat. No. 5,966,195.

(30) Foreign Application Priority Data

Sep. 12, 1997 (JP) .................................................. 9-248823
Sep. 12, 1997 (JP) .................................................. 9-248824

(51) Int. Cl.[7] .............................. G06T 11/40; G02F 1/13
(52) U.S. Cl. ........................................... 345/432; 349/187
(58) Field of Search .................................. 345/432, 904; 349/187

(56) References Cited

U.S. PATENT DOCUMENTS 5,231,521 * 7/1993 Johnson et al. ..................... 359/93

(List continued on next page.)

FOREIGN PATENT DOCUMENTS 195 03 851 A    8/1995 (DE) .

(List continued on next page.)

OTHER PUBLICATIONS

Authors—Ying Zhou, Zhan He and Susumu Sato, "A Novel Method for Determining the Cell Thickness and Twist Angle of a Twisted Nematic Cell by Stokes Parameter Measurement", May 1997, pp. 2760–2764.

(List continued on next page.)

Primary Examiner—Jeffery Brier
Assistant Examiner—Anthony J. Blackman
(74) Attorney, Agent, or Firm—Patterson, Thuente, Skaar & Christensen, P.A.

(57) ABSTRACT

A polarizing plate 4 is disposed to polarize light parallel to the X axis of liquid crystal display 3, which may be optionally rotated to a position where the intensity of a light that transmits the liquid crystal display 3 takes an extreme value (maximum or minimum) and an output Ix using a photodetector 6 is measured. The polarizing plate 4 is then disposed to polarize light parallel to the Y axis to thereby measure an output Iy using the photodetector 6. The polarizing plate 4 is then disposed to polarize the light in the direction inclined by 45 degrees between the X and Y axes to thereby measure an output I45 using the photodetector 6. A quarter wavelength plate 5 optionally may be disposed between the polarizing plate 4 and the liquid display 3 such that its axial direction is inclined by 45 degrees from the polarizing direction of the polarizing plate 4 while disposing the polarizing plate 4 so as to polarize light at 45 degrees from both the X and Y axes. In this position, an output Iq45 is measured by the photodetector. Stokes parameters are calculated according to each of the measured values Ix, Iy, I45 and Iq45, and according to the calculated Stokes parameters, the thickness of the liquid crystal layer and/or the twist angle of liquid crystal molecules of the liquid crystal display 3 can be determined. Optionally, the light intensities may be measured by a two-dimensional photodetector and Stokes parameters for a plurality of points on the liquid crystal display may be simultaneously or substantially simultaneously determined.

26 Claims, 4 Drawing Sheets

U.S. PATENT DOCUMENTS

| | | | |
|---|---|---|---|
| 5,239,365 | 8/1993 | Inoue | 356/367 |
| 5,291,322 * | 3/1994 | Itoh et al. | 359/55 |
| 5,298,972 | 3/1994 | Heffner | 356/364 |
| 5,517,309 * | 5/1996 | Barker | 356/364 |
| 5,532,823 | 7/1996 | Fukui et al. | 356/364 |
| 5,691,791 | 11/1997 | Nakamura et al. | 349/113 |
| 5,841,496 * | 11/1998 | Itoh et al. | 349/113 |
| 5,966,195 * | 10/1999 | Sato et al. | 349/187 |

FOREIGN PATENT DOCUMENTS

| | | |
|---|---|---|
| 54130976A | 10/1979 | (JP) . |
| 63-103925 | 5/1988 | (JP) . |
| 63-103927 | 5/1988 | (JP) . |
| 2-103427 | 4/1990 | (JP) . |
| 05172644A | 7/1993 | (JP) . |
| 5-172644 | 7/1993 | (JP) . |
| 6-18332 | 1/1994 | (JP) . |
| 06289382A | 10/1994 | (JP) . |
| 6-289-382 | 10/1994 | (JP) . |
| 07063670A | 3/1995 | (JP) . |
| 08128946A | 5/1996 | (JP) . |
| 09089760A | 4/1997 | (JP) . |
| 10153780A | 6/1998 | (JP) . |
| WO8607631 | 12/1986 | (WO) . |

OTHER PUBLICATIONS

Authors—Ying Zhou, Zhan He and Susumu Sato, "An Improved Stokes Parameter Method for Determination of the Cell Thickness and Twist Angle of Twisted Nematic Liquid Crystal Cells", May 1998, pp. 2567–2571.

Authors—Zhan He, Ying Zhou and Susumu Sato, "A Two–Dimensional Stokes Parameter Method for Determination of Cell Thickness and Twist Angle Distributions in Twisted Nematic Liquid Crystal Devices", Apr. 1998, pp. 1982–1988.

Authors—Zhan He, Ying Zhou, and Susumu Sato, "Determining 2D Thickness and Twist Angle Distributions of TN LC Devices Using Stokes Parameter Method", Nov. 1997, pp. 53–56.

Authors—Ying Zhou, Zhan He and Susumu Sato, "Determining Cell Gap and Twisted Angle of a Twisted Nematic Cell by Measuring Stokes Parameters", Nov., 1996, pp. 241–244.

Authors—Ying Zhou, Zhan He and Susumu Sato, "An Improved Stokes Parameter Method of Determining Cell Thickness and Twist Angle of TN LC Cells", Sep. 1997, pp. 101–104.

"Cell Gap Measurement —Compensation Method" printed in J. Appln. Phys. 69(3) published on Feb. 1, 1991.

"A New Method —Liquid Crystal" printed in Jpn. J. Appln. Phys. vol. 33 published on Mar. 15, 1994.

"Cell Gap Measurement —Compensation Method" printed in J. Appln. Phys. 69(3) published on Feb. 1, 1991.

"Novel Method—Liquid Crystal" printed in Jpn, J. Appln. Phys. vol. 35 published in Aug., 1996.

"The Evaluation of the Torsional Anchoring Energy of TN–cells" published at 22th Liquid Crystal Conference 1996 (No. 22 Ekisho Toronkai).

"A Novel Method —Parameter Measurement" printed in Jpn. J. Appln. Phys. vol. 36 published in May, 1997.

"An Improved Stokes —Crystal Cells" printed in Jpn. J. Appln. Phys. vol. 37 published in May, 1998.

"A Two–Dimensional ——Crystal Devices" printed in Jpn. J. Appln. Phys. vol. 37 published in Apr., 1998.

"An Improved ——TNLC Cells" published at 17th International Display Research Conference held at Toronto, Sep. 12,1997.

"A Two–Dimensional —Crystal Devices" printed in Jpn. J. Appln. Phys. vol. 37 published in Apr., 1998.

"Determining 2D —Parameter Method" printed in IDW'97 published in Nov., 1997.

Japanese Office Action dated Jul. 13, 1999 (English translation included).

European Search Report, Mar. 8, 2000.

Zhou et al, "A Novel Method for Determining the Cell Thickness and Twist Angle of a Twisted Nematic Cell by Stokes Parameter Measurement," May 1, 1997.

Japanese Office Action dated Jul. 18, 2000 for Japanese Application No. 9–248823.

Japanese Office Action dated Jul. 18, 2000 for Japanese Application No. 9–248824.

* cited by examiner

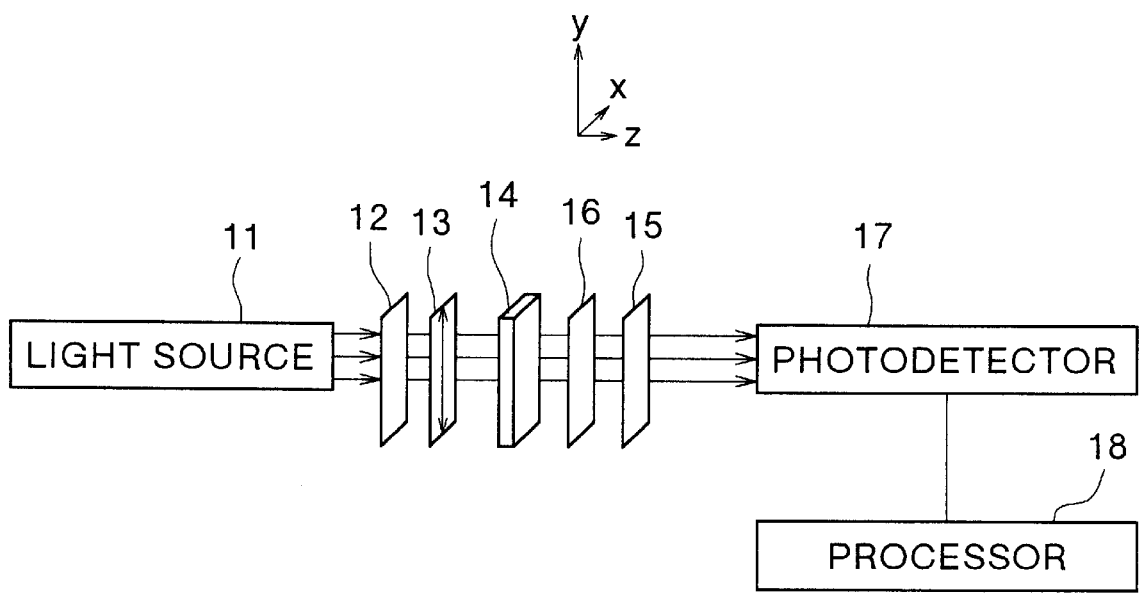
F I G . 4
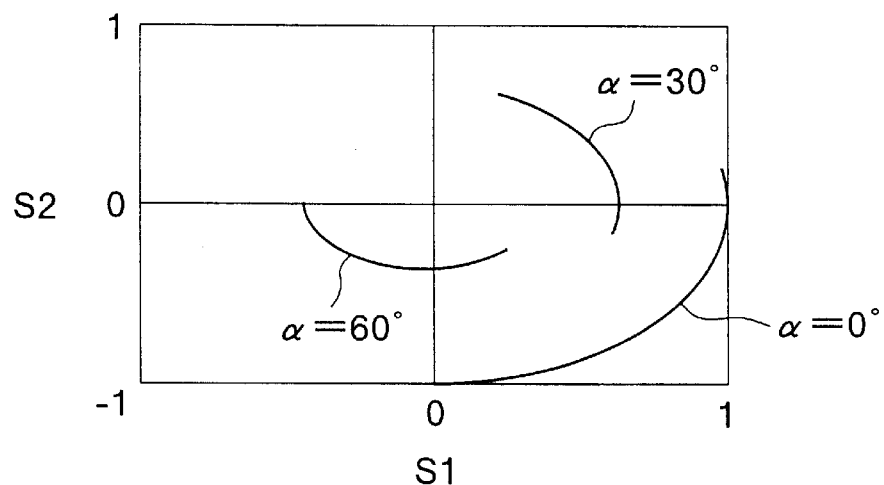
F I G . 5

METHODS AND APPARATUS FOR DETECTING LIQUID CRYSTAL DISPLAY PARAMETERS USING STOKES PARAMETERS

CROSS REFERENCE TO RELATED APPLICATIONS

This is a continuation-in-part of U.S. patent application Ser. No. 08/974,994, filed Nov. 20, 1997 and now U.S. Pat. No. 5,966,195.

BACKGROUND OF THE INVENTION

1. Field of the Invention

The present invention relates to methods and apparatus for detecting parameters of a liquid crystal display for use, for example, in a liquid crystal display unit. More particularly, the present invention relates to methods and apparatus for measuring the thickness of a liquid crystal layer and the twist angle of liquid crystal molecules within the liquid crystal layer.

2. Description of the Related Art

Liquid crystal displays (LCDs) having liquid crystal molecules oriented parallel to the surface of two substrates of the display, wherein the direction of orientation of the liquid crystal molecules are gradually twisted or rotated between the two substrates, are well known. One type of such liquid crystal displays is known as a twisted nematic liquid crystal display (hereinafter referred to as "TN display"), in which the direction of orientation is twisted 90 degrees from the front substrate to the back substrate. Another known twisted nematic liquid crystal display is a super twisted nematic liquid crystal display (hereinafter referred to as "STN display"), in which the direction of orientation of the liquid crystal molecules is twisted between 180 to 270 degrees. These liquid crystal displays are used widely in various liquid crystal display units, such as display units for word processors, personal computers and televisions.

For such liquid crystal display units, the image quality directly relates to the distance between the two substrates, and in particular, to the uniformity of the thickness of the liquid crystal layer. The thickness determines the distribution of the twist angle of the liquid crystal molecules and is directly related to the contrast properties of the LCD. The uniformity of cell thickness and twist angle distribution throughout the entire panel therefore determines the display performance of LCDs. In addition, the anchoring energy (i.e., the orientation restricting force in the azimuth angle direction on each substrate surface of the liquid crystal display), which is another important parameter of liquid crystal displays, can be determined from the thickness of the liquid crystal layer and the twist angle of the liquid crystal molecules between the two substrates. Therefore, the quick and accurate determination of the thickness of the liquid crystal layer and the twist angle of the liquid crystal molecules are long-felt needs for both practical manufacturing processes and fundamental physical studies of liquid crystals.

The following methods have been developed to determine such liquid crystal display parameters: (1) measuring the electrostatic capacity and optical phase difference of a liquid crystal display to determine the thickness of the liquid crystal layer; (2) measuring light interference and electrostatic capacity of an empty display before the liquid crystal molecules are sealed between the substrates, to thereby determine the thickness of the liquid crystal layer; (3) measuring the distance between the two substrates using a three-dimensional shape measuring method, to thereby determine the thickness of the liquid crystal layer; (4) disposing a liquid crystal display between two polarizing plates and adjusting the optical path difference using a photo-elastic modulation element to perform curve fitting of the transmitted light intensity characteristics and determine the twist angle of the liquid crystal molecules; and (5) disposing a liquid crystal display between two polarizing plates and rotating one or both of the liquid crystal display and the polarizing plates to find an angle at which the maximum or minimum transmitted light intensity is transmitted, to thereby determine the thickness of the liquid crystal layer and the twist angle of the liquid crystal molecules in the layer using the Jones Matrix Display. These methods are described, for example, in "J. Appl. Phys." (Vol. 69, pages 1304–1309, 1991), "Jpn. J. Appl. Phys." (Vol.33, pages L434–L436, 1994), "Jpn. J. Appl. Phys." (Vol.33, pages L1242–L1244, 1994), "Jpn. J. Appl. Phys." (Vol.35, pages 4434–4437, 1996), "Lecture Manuscripts for the $22^{nd}$ Panel Discussion for Liquid Crystal" (pages 139–140).

These methods may be classified into two types: extinction measurement methods and optoelectrical methods. The extinction measurement methods require some complicated rotation operations of the liquid crystal cell and/or polarizers for determine the angles of maximum and minimum transmissions. The optoelectrical measurement methods involve measuring optical transmissions at two different frequencies while rotating the analyzer and fitting the experimental curve using the Jones matrix method. Further, these methods are basically suited to measuring cell thickness and twist angle at only one probing point. In order to map a two-dimensional cell, the LCD must be mechanically moved from point to point. Thus, measurements of the cell thickness and twist angle of an entire display can not be performed quickly and with high accuracy using these methods.

SUMMARY OF THE INVENTION

Accordingly, one object of the present invention is to provide improved methods and apparatus for quickly, accurately and easily detecting parameters of a liquid crystal display, such as the thickness of a liquid crystal layer and the twist angle of liquid crystal molecules within the liquid crystal layer.

Preferably, liquid crystal parameters are determined by methods and apparatus that measure Stokes parameters of the liquid crystal display. For example, light intensity transmitted through a liquid crystal display can be measured and Stokes parameters for a particular of location within the liquid crystal display are determined based upon the measured transmitted light intensity. The thickness of the liquid crystal layer and/or the twist angle of the liquid crystal molecules can then be calculated using the determined Stokes parameters for the liquid crystal display. The methods and apparatus taught according to the present invention enable the simple, rapid and inexpensive determination of important characteristics of a liquid crystal display.

In an additional aspect of the present teachings, the apparatus can be adjusted so that light intensity transmitted through the liquid crystal display can be measured at an extreme value, i.e. a maximum or a minimum value. By calculating the Stokes parameters based upon these measured light intensities, the measuring operation can be further simplified.

Further, the liquid crystal parameters may be simultaneously or substantially simultaneously determined for a plurality of points within the liquid crystal display using an apparatus having a simple configuration. In this aspect of the present teachings, a two-dimensional photodetector may be utilized to measure light intensities. Thus, Stokes parameters, and therefore liquid crystal parameters, can be calculated for a variety of points within the liquid crystal display in a single operation. As a result, this aspect can permit an efficient operation to measure liquid crystal parameters for an entire liquid crystal display.

Other objects, feature and advantages of the present invention will be readily understood after reading the following detailed description together with the accompanying drawings and the claims.

BRIEF DESCRIPTION OF THE DRAWINGS

FIG. 4 shows a second representative embodiment of a detecting apparatus for performing a second representative method for determining liquid crystal display parameters.

FIG. 5 illustrates the relationship between Stokes parameters, the thickness of a liquid crystal layer, and the twist angle of liquid crystal molecules.

DETAILED DESCRIPTION OF INVENTION

Figure 1:
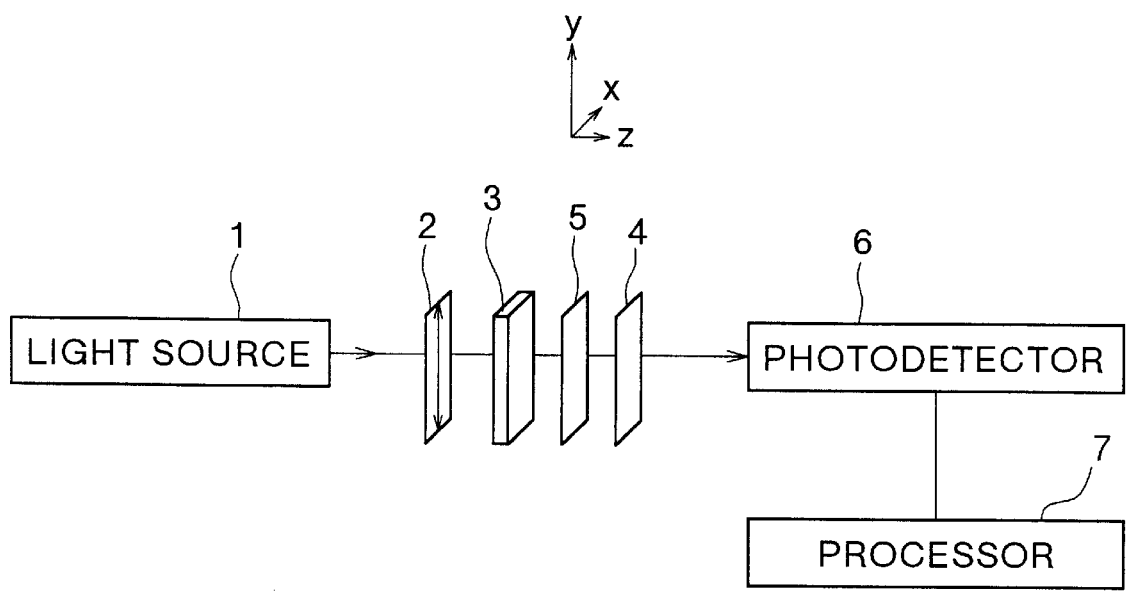
FIG. 1 shows a first representative embodiment of a detecting apparatus for performing a first representative method for determining liquid crystal display parameters.

Generally speaking, the present invention includes methods and apparatus for determining liquid crystal display parameters. Preferably, these methods generally include the steps of: (1) measuring light that is transmitted by liquid crystal display; (2) calculating liquid crystal display Stokes parameters according to the intensity of the measured transmitted light; and (3) determining either (i) the thickness (d) of a liquid crystal layer and/or (ii) the twist angle ($\phi$) liquid crystal molecules according to the calculated Stokes parameters. The light intensity may optionally be measured at an extreme value, i.e. a maximum or a minimum value. Also, the liquid crystal display parameters optionally may be simultaneously, or substantially simultaneously, determined for a plurality of liquid crystal cells within the liquid crystal display.

Preferably, the liquid crystal display parameters can be measured by disposing a polarizing plate between the liquid crystal display and a photodetector so as to polarize light parallel to the X axis relative to the liquid crystal display. The liquid crystal display optionally can be rotated into a position in which the output from the photodetector is either a maximum or minimum value. In this position, a value Ix is determined. After this step, the polarizing plate and liquid crystal display are adjusted so as to polarize the light parallel to the Y axis relative to the liquid crystal display and a value Iy is determined. The polarizing plate and the liquid crystal display can be adjusted one more time so as to polarize the light in the direction inclined by 45 degrees between the X and Y axes and a value I45 is determined. Finally, a quarter wavelength plate can be disposed between the polarizing plate and the liquid crystal display so that its axial direction is inclined by 45 degrees to the polarized direction of the polarizing plate while disposing the polarizing plate so as to polarize the light in the direction inclined by 45 degrees between the X and Y axes. A value Iq45 is measured in this configuration. These measurements can be obtained in any order and the measurements can optionally be simultaneously performed for a plurality of liquid cells by utilizing a two-dimensional photodetector.

Alternately, the liquid crystal display parameters can be determined by measuring transmitted light intensity by disposing a polarizing plate between the liquid crystal display and a photodetector so as to polarize a light parallel to the X axis relative to the liquid crystal display to thereby measure an output Ix from the photodetector. The liquid crystal display optionally can be rotated into a position in which the output from the photodetector is either a maximum or minimum value. The polarizing plate between the liquid crystal display and the photodetector can be rotated so as to polarize the light parallel to the Y axis relative to the liquid crystal display to thereby measure an output Iy from the photodetector. Finally, the polarizing plate disposed between the liquid crystal display and the photodetector can be rotated so as to polarize the Light along a direction of 45 degrees between the X and Y axes to thereby measure an output I45 from the photodetector. Again, these measurements can be obtained in any order and the measurements optionally may be simultaneously performed for a plurality of points on the liquid crystal display.

Preferably, the Stokes parameters for each liquid crystal display are calculated according to the measured transmitted light intensities as follows:

$S_0 = (Ix+Iy)/(Ix+Iy) = 1$
$S_1 = (Ix-Iy)/(Ix+Iy)$
$S_2 = [2(I45)-(Ix+Iy)]/(Ix+Iy)$
$S_3 = -[2(Iq45)-(Ix+Iy)](Ix+Iy)$

Alternatively, if the value Iq45 is not measured the Stokes parameters can be calculated as follows:

$S_0 = (Ix+Iy)/(Ix+Iy) = 1$
$S_1 = (Ix-Iy)/(Ix+Iy)$
$S_2 = [2(I45)-(Ix+Iy)]/(Ix+Iy)$

The cell thickness and twist angle for a particular cell or a plurality of cells can then be calculated based upon the measured Stokes parameters.

Preferably, apparatus for determining liquid crystal display parameters can include the following elements: a light source, a photodetector, a processor, a first polarizing plate disposed between the light source and a liquid crystal display, a second polarizing plate disposed between the liquid crystal display and the photodetector, and a quarter wavelength plate removably disposable between the liquid crystal display and the second polarizing plate. The processor can calculate Stokes parameters based upon the output of the photodetector. Light intensity transmit through the liquid crystal display is measured at maximum and/or minimum values and alternately or in conjunction therewith, the photodetector may be a two-dimensional photodetector. The measured light intensities can be utilized to calculate parameters, such as the thickness (d) of a liquid crystal layer and the twist angle ($\phi$) of liquid crystal molecules. Preferably, the Stokes parameters are calculated according to the equations disclosed herein and these Stoke parameters are utilized to determine the thickness and twist angle of the liquid crystal display. Apparatus according to the present teachings can include means to detect light intensities at a plurality of points within a liquid crystal display and so that the thickness and twist angle for the plurality of points can be simultaneously, or substantially simultaneously, determined.

Such apparatus thus may have a processor that concurrently accepts signals from a plurality of photodetectors representative of transmitted light intensities from a plurality of points on the liquid crystal display. The liquid crystal display can be rotated into a position in which the average output of the photodetectors at a plurality of points on the liquid crystal display takes an extreme value, such as a maximum or minimum value.

Each of the additional features and method steps disclosed above and below may be utilized separately or in conjunction with other features and method steps to provide an improved method and apparatus for determining liquid crystal parameters. Representative examples of the present invention, which examples utilize many of these additional features and method steps in conjunction, will now be described in detail with reference to the drawings. This detailed description is merely intended to teach a person of skill in the art further details for practicing preferred aspects of the present teachings and is not intended to limit the scope of the invention. Only the claims define the scope of the claimed invention. Therefore, combinations of features steps disclosed in the following detail description may not be necessary to practice the invention in the broadest sense, and are instead taught merely to particularly describe preferred embodiments of the invention.

Example 1

FIG. 1 depicts a first representative embodiment of a liquid crystal display parameter detecting apparatus for determining liquid crystal display parameters. Light source 1, which is for example a He-Ne laser beam of having a wavelength of 632.8 nm, generates light that is applied along a Z axis of liquid crystal display 3. The Z axis is orthogonal to both the X and Y axes as shown in FIG. 1. Generally speaking, liquid crystal display 3 comprises a multiplicity of liquid crystal cells.

Polarizing plate (polarizer) 2 is preferably disposed between light source 1 and liquid crystal display 3 and polarizes light parallel to the Y axis. Polarizing plate (analyzer) 4 and quarter wavelength plate 5 are preferably disposed between liquid crystal display 3 and photodetector 6. Polarizing plate 4 is provided to polarize light transmitted by liquid crystal display 3 parallel to the X axis direction, to the Y axis direction, and in a direction that is 45 degrees between the X and Y axes. Quarter wavelength plate 5 is removably provided in an axial direction that is 45 degrees from the polarizing direction of polarizing plate 4. Quarter wavelength plate 5 can be inserted in between liquid crystal display 3 and polarizing plate 4 or removed from the apparatus of FIG. 1 depending upon which measurements are to be taken.

Photodetector 6 measures the intensity of light that is transmitted through polarizing plate 2, liquid crystal display 3, polarizing plate 4, and if appropriate quarter polarizing plate 5, and generates a transmitted light intensity signal. Photodetector 6 may be, for example, a photodiode. Processor 7 computes Stokes parameters of the liquid crystal display 3 based the transmitted light intensity signals generated by the photodetector 6. In addition, processor 7 also computes the thickness of the liquid crystal layer of the display 3 and the twist angle of the liquid crystal molecules in the displays using the computed Stokes parameters. Processor 7 may be, for example, a personal computer and may include source code for calculating the Stokes parameters based upon the measured light intensities and for calculating the cell thickness and twist angle based upon the Stokes parameters.

The operating principles for the first representative embodiment will now be described with reference to the coordinate system shown in FIG. 2. Incident light enters display 3 along the Z axis direction (i.e., coming in from back to front of the paper in FIG. 2). Polarizing plate 2 disposed on the light incident side polarizes light parallel to the Y axis. The angle between the director (orientation) of the liquid crystal molecules at the light incident side of liquid crystal display 3 and the X axis (hereinafter referred to as the orientation of the liquid crystal display at the light incident side) will be identified as $\alpha$ and the twist angle of liquid crystal molecules in the liquid crystal display 3 will be identified as $\phi$. Consequently, the director (orientation) of the liquid crystal molecules at the opposite side of the liquid crystal display 3 is rotated or twisted by an angle $\phi$ from the light incident side.

If liquid crystal display 3 is disposed so that the director of the liquid crystal molecules at the light incident side becomes parallel to the X axis in this state, the Jones matrix indicating the polarizing action of the liquid crystal display 3 can be represented by the following equation (1):

$$J_{LC} = e^{j\frac{\pi d}{\lambda}(ne'+no)} \begin{bmatrix} a & b \\ -b^* & a^* \end{bmatrix}. \tag{1}$$

In this equation, a* and b* represent conjugate complex numbers of a and b (each of the numbers is obtained by inverting the sign of an imaginary number).

In equation (1), a and b can be defined as follows:

$$a = \frac{1}{x}\sin\phi\sin(x\phi) + \cos\phi\cos(x\phi) + j\frac{u}{x}\cos\phi\sin(x\phi) \tag{2}$$

$$b = \frac{1}{x}\cos\phi\sin(x\phi) - \sin\phi\cos(x\phi) + j\frac{u}{x}\sin\phi\sin(x\phi).$$

And x, u and w are defined as follows:

$$x = \sqrt{1+u^2} \tag{3}$$

$$u = \frac{\pi d}{\lambda\phi}(ne' - no) = \frac{\pi d}{\lambda\phi}\left(\frac{ne}{\sqrt{1+w\sin^2\theta s}} - no\right)$$

$$w = \left(\frac{ne}{no}\right)^2 - 1.$$

In equation (3), no and ne are the ordinary and extraordinary indices of the refraction of the LC materials. The symbol $\lambda$. A represents a wavelength of a light emitted by light source 1. The symbol $\theta s$ represents a pre-tilt angle (angle of liquid crystal molecules inclined from substrates). The symbol d represents the thickness of a liquid crystal cell. The phase factor $\exp[j\ (\pi d/\lambda)(ne'=no)]$ of equation (1), which is not particularly important to the present application, will be omitted in the description below.

Figure 2:
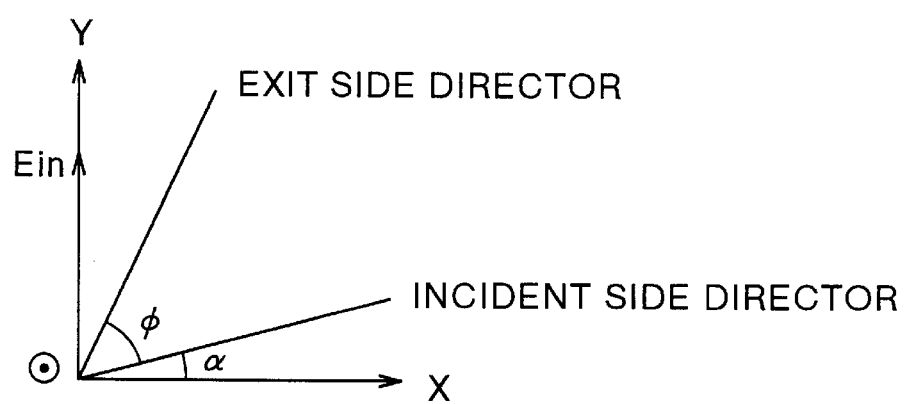
FIG. 2 illustrates the relationship between incident light polarizing direction, orientation of liquid crystal molecules, and the twist angle of liquid crystal molecules.

With reference to the coordinate system shown in FIG. 2, the transmission axis of the entrance polarizer is set on the Y axis. The entrance LC director forms an angle $\alpha$ with the X axis. The director of the LC in TN-LC cell is twisted by an angle $\phi$, so that the exit LC director forms an angle $\phi$ with the entrance LC director. Light is normally incident along the Z axis. The electric (p)olarized light) field components Ex and Ey in the directions of both X and Y axes with respect to the intensity of the light that is transmitted through the liquid crystal display 3 can be represented by the following matrix:

$$\begin{bmatrix} Ex \\ Ey \end{bmatrix} = \begin{bmatrix} \cos\alpha & -\sin\alpha \\ \sin\alpha & \cos\alpha \end{bmatrix} \begin{bmatrix} a & b \\ -b^* & a^* \end{bmatrix} \begin{bmatrix} \cos\alpha & \sin\alpha \\ -\sin\alpha & \cos\alpha \end{bmatrix} \begin{bmatrix} 0 \\ 1 \end{bmatrix}. \quad (4)$$

And a and b in equation (4) are defined as follows:

$$a = a_1 + ja_2$$
$$b = b_1 + jb_2 \quad (5).$$

By combining equations (2) and (5), $a_1$, $a_2$, $b_1$ and $b_2$ can be represented by the following equations:

$$a_1 = \frac{1}{x}\sin\phi\sin(x\phi) + \cos\phi\cos(x\phi) \quad (6)$$
$$a_2 = \frac{u}{x}\cos\phi\sin(x\phi)$$
$$b_1 = \frac{1}{x}\cos\phi\sin(x\phi) - \sin\phi\cos(x\phi)$$
$$b_2 = \frac{u}{x}\sin\phi\cos(x\phi).$$

From the matrix in equation (4), the electric field components Ex and Ey in the directions of both X and Y axes with respect to the intensity of the transmitted light can be represented by the following equations:

$$Ex = b_1 + j(a_2 \sin 2\alpha + b_2 \cos 2\alpha)$$
$$Ey = a_1 + j(a_2 \cos 2\alpha + b_2 \sin 2\alpha) \quad (7).$$

The Stokes parameters $S_0$ to $S_3$ representing the state of a polarized light, respectively, can be represented by the electric field components Ex and Ey in the directions of both the X and Y axes for a transmitted light intensity with respect to the light that is transmitted through liquid crystal display 3. Consequently, the Stokes parameters $S_0$ to $S_3$ are represented by the following equations (8) when the electric field components Ex and Ey in the directions of both the X and Y axes for the transmitted light intensity in equation (7) are used:

$$S_0 = ExEx^* + EyEy^* = a_1^2 + a_2^2 + b_1^2 + b_2^2 = 1$$
$$S_1 = ExEx^* - EyEy^* = b_1^2 - a_1^2 - a_2^2 \cos 4\alpha + b_2^2 \cos 4\alpha + 2a_2b_2 \sin 4\alpha$$
$$S_2 = ExEy^* + Ex^*Ey = 2a_1b_1 + (b_2^2 - a_2^2)\sin 4\alpha - 2a_2b_2 \cos 4\alpha$$
$$S_3 = j[ExEy^* - Ex^*Ey] = 2b_1(b_2 \sin 2\alpha - a_2 \cos 2\alpha) - 2a_1(a_2 \sin 2\alpha + b_2 \cos 2\alpha) \quad (8).$$

These Stokes parameters describe the polarization state of the exit light beam. The relation $S_0^2 = S_1^2 + S_3^2 = 1$ holds for the case when the light is completely polarized, so that at least two of the values are independent variables.

Figure 3:
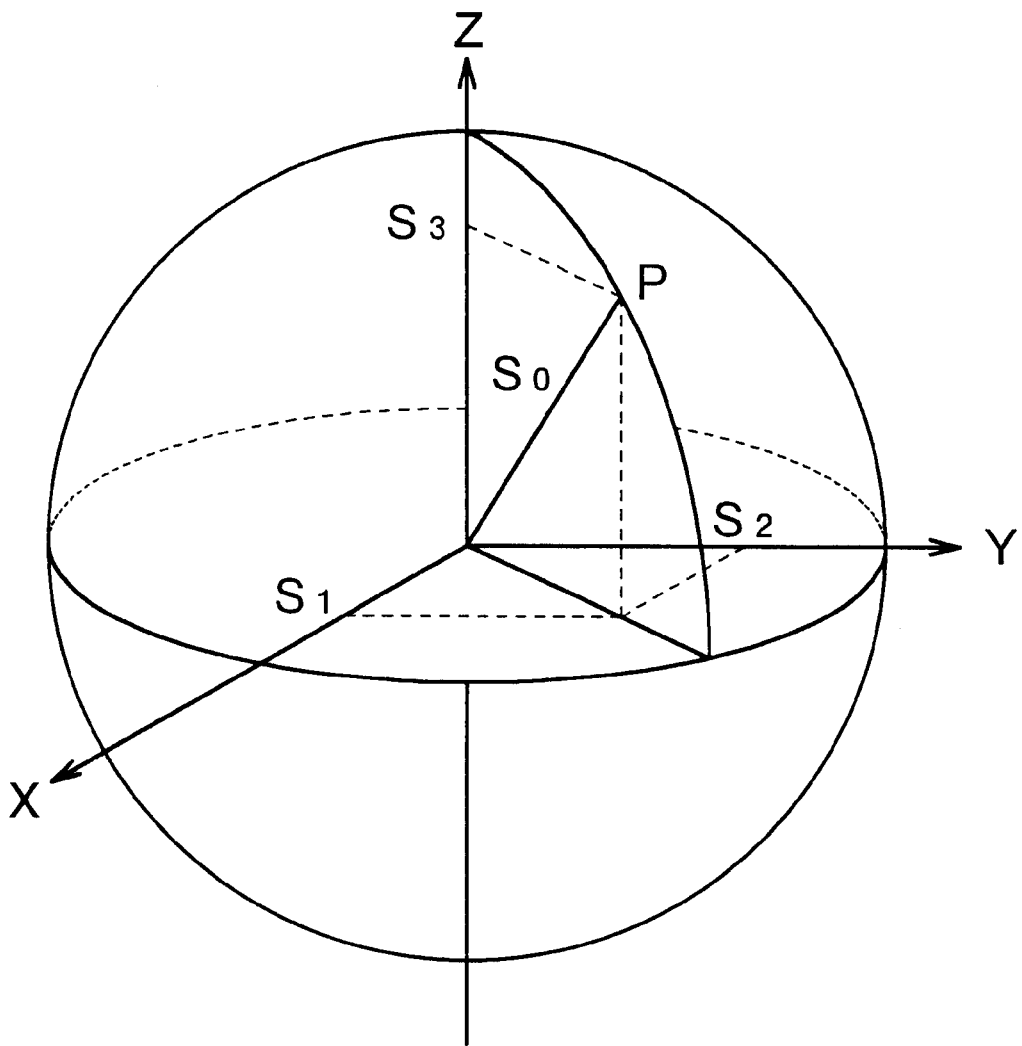
FIG. 3 illustrates a Poincare sphere.

The Stokes parameters $S_0$ to S3 represent a point P on the surface of the Poincare sphere shown in FIG. 3. Consequently, the state of a polarized light can be determined by finding the appropriate point on the surface of the Poincare sphere. In this case, the Stokes parameters $S_0$ to $S_3$ are functions of $a_1$, $a_2$, $b_1$ and $b_2$ as shown in the equation (11). The values $a_1$, $a_2$, $b_1$ and $b_2$, in turn, are functions of the twist angle $\phi$, x and u as shown in equation (6). The values x and u are functions of the thickness d of the liquid crystal layer and the twist angle $\phi$ of the liquid crystal molecules as shown in equation (3). These parameters x and u are basically two sets of parameters that are independent of the Stokes parameters $S_1$, $S_2$ and $S_3$. Consequently, when the values of two sets of the Stokes parameters $S_1$ to $S_3$ are found, the twist angle $\phi$ of the liquid crystal molecules and the thickness d of the liquid crystal layer can be determined.

If the angle $\alpha$ and the pre-tilt angle θs are known, and the Stokes parameters S1, S2 and S3 are measured using the representative liquid crystal display parameter detecting apparatus of FIG. 1, the twist angle $\phi$ and the thickness d can be determined using the following representative steps:

First, polarizing plate 4 is placed between liquid crystal display 3 and photodetector 6 and adjusted to polarize the light parallel to the X axis, which is normally incident on a LC cell. The transmitted light intensity signal generated by photodetector 6 at that position is measured and defined as the transmitted light intensity Ix.

Polaizing plate 4 is then adjusted to polarize light parallel to the Y axis. In this state, the transmitted light intensity signal generated by photodetector 6 is read to measure the transmitted light intensity Iy.

Polanztng plate 4 is then set to polarize light in a direction of 45 degrees between the X and Y axes. In this state, the transmitted light intensity signal generated by photodetector 6 is read to measure the transmitted light intensity I45.

Finally, quarter wavelength plate 5 is disposed between the polarizing plate 4 and the liquid crystal display 3 so that its axial direction is inclined by 45 degrees from the polarizing direction of the polarizing plate 4 (that is, along the Y axis) in the state that the light is polarized by the polarizing plate 4 in the direction inclined by 45 degrees from both the X and Y axes. The transmitted light intensity signal generated by photodetector 6 at this time is read to measure the transmitted light intensity Iq45.

The various measurements can be taken in any order that is convenient, as no particular order of measurements is necessary.

The Stokes parameters can be represented by the following equations using the transmitted light intensity values Ix, Iy, I45 and Iq45, measured as described above:

$$S_0 = \frac{Ix + Iy}{Ix + Iy} = 1 \quad (9)$$
$$S_1 = \frac{Ix - Iy}{Ix + Iy}$$
$$S_2 = \frac{2I45 - (Ix + Iy)}{Ix + Iy}$$
$$S_3 = -\frac{2Iq45 - (Ix + Iy)}{Ix + Iy}.$$

In this case, (Ix+Iy) is a transmitted light intensity value and the Stokes parameters represented in equation (9) are normalized with (Ix+Iy).

Consequently, the Stokes parameters $S_1$, $S_2$ and $S_3$ can be found by substituting the measured transmitted light intensity values Ix, Iy, I45 and Iq45 for equation (9). After this, the twist angle $\phi$ of the liquid crystal molecules and the thickness d of the liquid crystal layer can be obtained by these Stokes parameters $S_1$, $S_2$ and $S_3$, as well as by the equations (11), (6) and (3). Preferably, processor 7 performs all of those calculations. Processor 7 can also output onto a display screen, a printer, etc., the twist angle $\phi$ of the liquid crystal molecules and the thickness d of the liquid crystal layer.

Because $S_0$ is 1 and equals $S_1^2+S_2^2+S_3^2$ according to the Stokes equations when the light is completely polarized, this relationship can be utilized to minimize measurement errors. For example, if an error is introduced into the measurement of transmitted light intensity values Ix, Iy, I45 and Iq45, etc., $S_1^2+S_2^2+S_3^2$ can not be set equal to 1. In such a case, the closest point on surface of the Poincare sphere corresponding to the Stokes parameters found from the transmitted light intensity values is located and the Stokes parameter for that point is used. By using this technique, measurement errors can be minimized.

Table 1 shows the thickness d of the liquid crystal layer of a liquid crystal display and the twist angle φ of the liquid crystal molecules in the display, which were determined, respectively, by the liquid crystal display parameter detecting method of this representative embodiment.

TABLE 1

| | Designed Value | | Measured Value | |
|---|---|---|---|---|
| Sample | Cell Thickness | Twist Angle | Cell Thickness | Twist Angle |
| Sample 1 | 25 μm | 30° | 25.32 μm | 29.79° |
| Sample 2 | 25 μm | 85° | 24.85 μm | 85.97° |
| Sample 3 | 5 μm | 85° | 4.87 μm | 83.85° |

Sample 1 was prepared as follows: A polyvinyl alcohol (PVA) film was coated on a transparent conductive film coated glass substrate as an orientation film using a spin-coating method, and the surface was heated. The surface was then rubbed in one direction to provide an orientation force for the liquid crystal molecules. Two substrates were aligned with glass fiber spacers and nematic liquid crystal E7 sealed therebetween. The liquid crystal layer was set to a thickness of 25 μm and a twist angle of 30 degrees. The thickness d and the twist angle φ were determined to be d=25.32 μm and φ=29.79 degrees, respectively, based upon the measured Stokes parameters of S1=0.696, S2=0.634 and S3=0.331.

Sample 2 was prepared according to the steps of sample 1 with a nematic liquid crystal E7 having a thickness of 25 μm and a twist angle of 85 degrees. The thickness and twist angle of sample 2 was determined to be d=24.85 μm φ=85.97 degrees, respectively, based upon the measured Stokes parameters of S1=−0.158, S2=−0.873 and S3=0.460.

Sample 3 was prepared in the same manner as samples 1 and 2, except that the liquid crystal material K15 was substituted for E7 and the cell thickness and twist angle were designed to be 5 μm and 85 degrees. The measured Stokes parameters were S1=0.265, S2=0.534 and S3=−0.807 resulting in the values of d=4.87 μm and φ=83.85 degrees.

Because the liquid crystal display parameter detecting method described in the first embodiment only requires that the intensity of a light transmitted by the liquid crystal display be measured, the measuring accuracy is higher than for techniques that measure electrostatic capacity, optical phase difference, etc.

EXAMPLE 2

Because the electric field components Ex and Ey in the directions of both X and Y axes with respect to the transmitted light intensity include a sine wave function in the orientation α at the light incident side of the liquid crystal display 3, each has an extreme value (i.e., maximum or minimum value). The conditions under which the electric field components Ex and Ey may achieve such extreme values are given by the following equation:

$$\tan 4\alpha m = \frac{2a_2^2 b_2^2}{b2^2 - a_2^2}. \quad (10)$$

In equation (10), the value αm represents α taken when the electric field components Ex and Ey are an extreme value, respectively. When the value αm in equation (10) is substituted for α in equation (7), the electric field components Ex and Ey in the directions of both the X and Y axes of transmitted light intensity can be represented independently of the orientation α at the light incident side of liquid crystal display 3.

When the αm in equation (10) is substituted for α in equation (8), the Stokes parameters $S_0$ to $S_3$ can be represented only by the values $a_1$, $a_2$, $b_1$ and $b_2$, independently of the orientation α at the light incident side of liquid crystal display 3. The Stokes parameters will have slight differences for each 45° range of αm. For example, when αm is between 0 to 45°, the Stokes parameters are represented by the following equation (11):

$$S_0 = a_1^2 + a_2^2 + b_1^2 + b_2^2 = 1 \quad (11)$$

$$S_1 = b_1^2 - a_1^2 + b_2^2 + a_2^2$$

$$S_2 = 2a_1 b_1$$

$$S_3 = -2a_1 \frac{a_2|a_2| + b_2|b_2|}{\sqrt{a_2^2 + b_2^2}}.$$

For each of the αm ranges (45–90°, 90–135° and 135–180°), $S_2$ remains the same. However, while $S_1$ is the same for the range of 90–135°, it is $b1^2-a1^2-b2^2-a2^2$ for the ranges of 45–90° and 135–180°. Finally, the value (−2a1) in $S_3$ changes from 2b1 to 2b1 to −2b1 for the ranges 45–90°, 90–135° and 135–180°, respectively.

A theoretical accuracy analysis for a cell having a thickness of 10 μm and a twist angle of 85° shows that the use of this technique can provide a high accuracy measuring technique. For example, with the equations for the αm range of 0–45°, if the Stokes parameters have a 5% variation, the measurement errors for the cell thickness and twist angle will be only 0.03 μm and 0.50°, respectively. Similarly, if the Stokes parameters have a 10% variation, the measurement errors for the cell thickness and twist angle will be only 0.06 μm and 1°, respectively. Furthermore, with the equations for the αm range of 45–90°, if the Stokes parameters have a 5% variation, the measurement errors for the cell thickness and twist angle will be only 0.0009 μm and 0.24°, respectively; while if the Stokes parameters have a 10% variation, the measurement errors for the cell thickness and twist angle will be only 0.002 μm and 0.47°, respectively. These results indicate that high measurement accuracy can be achieved by this method if the Stokes parameters of the transmitted light of the cell are measured correctly.

Based upon experimental results, measurements performed in the αm range of 45–90° may be most suitable for large twist angle cells and a αm range of a 0–45° is most suitable for small twist angle cells. Therefore, if the Stokes parameters $S_1$, $S_2$ and $S_3$ are measured experimentally at such particular angles, the twist angle and cell thickness can be determined by solving any two independent Stokes parameters given in equation (11).

When measuring the transmitted light intensity at an extreme value in such a way, photodetector 6 corresponds to a transmitted light intensity detecting apparatus that detects the intensity of light transmitted by the liquid crystal display at an extreme value.

Of course, a variety of methods are available for measuring such transmitted light intensity. For example, liquid crystal display 3 can be rotated according to signals generated by processor 7. The position of liquid crystal display 3 and the transmitted light intensity signals generated by photodetector 6 at each position are measured and stored sequentially. Thereafter, the maximum or minimum transmitted light intensity signals are selected from the stored transmitted light intensity signals, so that the appropriate signal is identified to be the transmitted light intensity Ix.

Alternately, liquid crystal display 3 can be rotated to a position where the transmitted light intensity signal takes the maximum or minimum value. The polarizing direction of polarizing plate 4 can be adjusted and/or quarter wavelength plate 6 is inserted to measure the transmitted light intensity values Iy, I45 and Iq45. In such a case, photodetector 6 and processor 7 correspond to a transmitted light intensity detecting apparatus that detects the intensity of light transmitted by the liquid crystal display at an extreme value, respectively.

Furthermore, liquid crystal display 3 can instead be fixed and both polarizing plates 2 and 4 can be rotated to measure the various transmitted light intensities. In this case, the system coordinates may be rotated and measured simultaneously.

An optical system for measuring such Stokes parameters can be constructed according to the teachings of Example 1 and therefore, such teachings need not be repeated. Experiments were also performed according to the teachings of Examples 1 and 2, using the appropriate values for αm. The results are shown below in Table 2.

TABLE 2

| | Designed Value | | Measured Value | |
| --- | --- | --- | --- | --- |
| Sample | Cell Thickness | Twist Angle | Cell Thickness | Twist Angle |
| Sample 4 | 10 μm | 90° | 9.57 μm | 89.26° |
| Sample 5 | 5 μm | 80° | 5.51 μm | 80.46° |
| Sample 6 | 5 μm | 90° | 5.43 μm | 77.24° |

Samples 4 and 5 were constructed according to the teachings of Example 2. Sample 6 was constructed by coating a rubbed PVA film onto one substrate and on the other side, polyvinylcinnamate (PVCi) was irradiated by polarized UV light and liquid crystal material K15 was injected between the two substrates separated by glass spacers having a diameter of 5 μm.

The measured thickness values were in good agreement for all designed values. The measured twist angles were close to the designed values for the strong anchoring of the rubbed PVA layer in samples 4 and 5. However, due to the weak anchoring property of the PVCi film, the twist angle of sample 6 was much smaller than 90°. We calculated the azimuthal anchoring strength of sample 6 with this twist angle to be about $4.6=10^{-6}$ J/m$^2$, which is in agreement with values provided by other researchers.

The detecting method described in the second representative embodiment only measures the transmitted light intensity at an extreme value. Therefore, because no human decision is required to determine the appropriate orientation of liquid crystal molecules at the light incident side of the liquid crystal display, this technique is thus easy to operate and process.

Example 3

The teachings of Examples 1 and 2 can be readily extended to a 2-D measurement system, because 2-D Stokes parameter distributions can be easily obtained by measuring the 2-D transmission light intensity distributions using a 2-D array photodetector or camera. Preferably, a CCD array or similar photodetector is utilized to simultaneously measure a plurality of light intensities. By solving the Stokes parameter equations for each spatial point for which light intensity is measured, 2-D cell thickness and twist angle distributions can be prepared without the need to move the LCD.

FIG. 4 depicts a representative liquid crystal display parameter detecting apparatus for performing a third representative method for detecting liquid crystal display parameters. In this embodiment, both the thickness of the liquid crystal display and twist angle of the liquid crystal molecules are determined simultaneously, or substantially simultaneously, at a plurality of points on the liquid crystal display to thereby determine the two-dimensional distribution of these values.

Light source 11 can be a white light source, such as a halogen lamp, or a single color light source and should preferably be able to direct light almost orthogonal to a plurality of points on the substrate liquid crystal display 14. The light from light source 1 is applied along the Z axis orthogonal to both the X and Y axes as shown in FIG. 4. Color filter 12 is disposed to improve the function of quarter wavelength plate 16 (to be described later) so that light from light source 11 is filtered to transmit a single color light when a white light source is used as the light source 11. Naturally, no color filter 12 is needed when a single color light source is used as the light source 11.

As in the first representative embodiment, polarizing plate (polarizer) 13 is disposed between light source 11 and liquid crystal display 14 and is arranged to polarize light parallel to the Y axis. Polarizing plate (polarizer) 15 and quarter wavelength plate 16 are disposed between liquid crystal display 14 and photodetector 17. Polarizing plate 15 is provided to permit the polarized direction to be set in the X axis direction, in the Y axis direction and in the direction 45 degrees between the X and Y axes. Quarter wavelength plate 16 is disposed such that its axial direction is rotated 45 degrees from the polarizing direction of polarizing plate 15. Quarter wavelength plate 16 can be inserted between liquid crystal display and polarizing plate 15 or removed therefrom.

Photodetector 17 preferably is a two-dimensional photodetector, such as a CCD camera, etc., which can detect the intensity of light concurrently transmitted by a plurality of points on liquid crystal display 14. Photodetector 17 preferably generates transmitted light intensity signals of the light transmitted by the plurality of points on the liquid crystal display 14 concurrently. Most preferably, a 16-bit CCD camera having a thermoelectrically cooled head with 783×520 pixels and a maximum gray scale value of approximately 65535 is utilized. This camera may have a wide and linear dynamic range, which is preferable for accurate measurements of the polarization states.

Processor 18 computes Stokes parameters for a plurality of points on the liquid crystal display 14 according to the transmitted light intensity signals generated by photodetector 17. In addition, processor 18 computes liquid crystal display parameters of the thickness of the liquid crystal layer and the twist angle of liquid crystal molecules, etc., for a plurality of points on the liquid crystal display 14 concurrently according to the calculated Stokes parameters. The processor 18 may be, for example, a personal computer.

The operating principle of this second representative embodiment will now be described with respect to the coordinate system shown in FIG. 2. As noted above, the Jones matrix indicating the polarizing function of the liquid crystal display 14 is represented by equation (1). The values a and b in equation (1) are also represented by equation (2). The values x, u, and w are represented by equation (3). The matrix of equation (4) is used to represent the electric field (polarized light) components Ex and Ey in the directions of both the X and Y axes for the intensity of light transmitted by the liquid crystal display 14. If a and b in equation (4) are defined as shown in equation (5), $a_1$, $a_2$, $b_1$ and $b_2$ are represented as shown in equation (6) in accordance with equation (2). In addition, according to the matrix in equation (4), the electric field components Ex and Ey in the directions of both the X and Y axes for the transmitted light intensities are represented as shown in equation (7). Consequently, the Stokes parameters $S_0$, $S_1$, $S_2$ and $S_3$ indicating the state of a polarized light, respectively, are represented as shown in equation (9) for the light that transmits the liquid crystal display 14.

The Stokes parameters $S_0$ to $S_3$ are functions of $a_1$, $a_2$, $b_1$, and $b_2$ and $\alpha$ as shown in equation (8). The values $a_1$, $a_2$, $b_1$ and $b_2$ are functions of the twist angle $\phi$, x and u as shown in equation (6). In addition, x and u are functions of the thickness d of the liquid crystal layer and the twist angle $\phi$ of the liquid crystal molecules as shown in equation (3). On the other hand, x and u are basically two sets of independent parameters of the Stokes parameters $S_1$, $S_2$ and $S_3$. Consequently, when the orientation $\alpha$ at the light incident side of the liquid crystal display 14 is already known, the twist angle $\phi$ and the thickness d can be determined by calculating the values of two sets of the Stokes parameters $S_1$, $S_2$ and $S_3$.

The spatial resolution of a 2-D system is determined by the size of one pixel of the photodetector. The spatial resolution can be adjusted by magnification with a microscope. A spatial resolution of approximately 1 μm per pixel has been realized using a 4×5 times magnification microscope. By increasing the magnification, higher spatial resolutions can be easily realized.

FIG. 5 shows the relationship among Stokes paraneters, $\alpha$, $\phi$, and d. In this case, the liquid crystal material is K15, the light source has a wavelength of 632.8 nm, and a liquid crystal display having a liquid crystal layer thickness of 10 μm are used. FIG. 5 shows how the state of each of the Stokes parameters $S_1$ and $S_2$ changes when the angle $\phi$ is changed for 40 to 90 degrees for the angle $\alpha$ being set at 0, 30 and 60 degrees. As shown in FIG. 5, the value $\alpha$ changes the relationship between the Stokes parameters $S_1$ and $S_2$, and the twist angle $\phi$. Consequently, selection of $\alpha$ particular a can reduce the influence of the twist angle $\phi$ on the detecting accuracy, which influence is caused by detection errors of the Stokes parameters.

The twist angles $\phi$ and the thickness d of a liquid crystal layer can be concurrently detected at a plurality of points on a liquid crystal display using the detecting apparatus shown in FIG. 4 according to the following representative steps:

First, the polarizing plate 15 disposed between liquid crystal display 14 and photodetector 17 is adjusted to polarize light parallel to the X axis. According to the transmitted light intensity signal generated by photodetector 17 at this time, the transmitted light intensity Ix at a plurality of points on liquid crystal display 14 is measured.

Polarizing plate 15 is then adjusted to polarize light parallel to the Y axis. According to the transmitted light intensity signal generated by photodetector 17 at this time, the transmitted light intensity Iy at a plurality of points on liquid crystal display 14 is measured.

Polarizing plate 15 is then set to polarize light in a direction of 45 degrees between the X and Y axes. According to the transmitted light intensity signal outputted from photodetector 17 at this time, the transmitted light intensity I45 at a plurality of points on liquid crystal display 14 is measured.

Finally, with polarizing plate 15 being set to polarize light in the direction of 45 degrees between the X and Y axes, quarter wavelength plate 16 is disposed between polarizing plate 15 and liquid crystal display 14 such that its axial direction is inclined by 45 degrees from the polarizing direction of polarizing plate 15 (that is, toward the Y axis). In addition, according to the transmitted light intensity signal generated by photodetector 17 at that time, the transmitted light intensity Iq45 is measured at a plurality of points on liquid crystal display 14.

The transmitted light intensity values Ix, Iy, I45 and Iq45 measured as described above are substituted into equation (9), so that the Stokes parameters $S_1$, $S_2$ and $S_3$ can be calculated for a plurality of points on liquid crystal display 14. In addition, according to the calculated Stokes parameters $S_1$, $S_2$ and $S_3$ at a plurality of points on liquid crystal display 14, as well as equations (11), (6) and (3), it is possible to concurrently determine the twist angle $\phi$ and the thickness d of the liquid crystal layer for a plurality of points on liquid crystal display 14. Thus, if desired, when calculating the Stokes parameters $S_1$ and $S_2$, measurement of the value Iq45 can be omitted. In this case, because quarter wavelength plate 16 is not necessary, the configuration of the detecting apparatus can be simplified.

Processor 8 preferably performs all of the calculations and can also output Stokes parameters, the twist angle of liquid crystal molecules and the thickness of the liquid crystal layer for a plurality of points on the liquid crystal display onto a display screen, a printer, etc. Various display techniques, such as tables, graphs and charts, can be used to display such two-dimensional distribution data. Consequently, the distribution of Stokes parameters, the twist angle of liquid crystal molecules, and the thickness of the liquid crystal layer can be easily determined by sight, if desired. As a result, the quality of a liquid crystal display can be easily and accurately determined.

Although the orientation $\alpha$ is already known at the light incident side of the liquid crystal display in the above case, calculation of the value $\alpha$ is necessary if the value is unknown, of course. For example, polarizing plate 13 or liquid crystal display 14 can be rotated to measure the values Ix, Iy, I45 and Iq45 corresponding to each of different $\alpha$ values. The value $\alpha$ can then be determined from the measured values. As described above, the relationship $S_1^2 + S_2^2 + S_3^2 = 1$ also can be utilized to minimize measurement errors.

When the liquid crystal display parameter detecting method in this embodiment is used, photodetector 17 corresponds to a transmitted light intensity detecting apparatus. In this embodiment, the orientation $\alpha$ at the light incident side of the liquid crystal display must be determined. However, Stokes parameters can be detected at a plurality of points on the liquid crystal display, as well as the twist angle of liquid crystal molecules and the thickness of the liquid crystal layer at a plurality of points on the liquid crystal display without deciding the orientation $\alpha$ at the light incident side of the liquid crystal display.

In other words, as described in the first representative embodiment, equation (8) specifies the condition on which an extreme value (maximum or minimum) is taken by the electrical field components Ex and Ey in the directions of both the X and Y axes for the transmitted light intensity, respectively. When the value αm in equation (10) is substituted for the α in equation (7), the electric field components Ex and Ey in the directions of both the X and Y axes for the transmitted light intensity can be represented independently of the value α. Stokes parameters $S_0$ to $S_3$ are thus determined only by the values $a_1$, $a_2$, $b_1$ and $b_2$ and are independent of the orientation α at the light incident side of liquid crystal display 14. As an example, when am is between 0 to 45 degrees, the Stokes parameters are represented as shown in equation (11). In addition, $a_1$, $a_2$, $b_1$ and $b_2$ are functions of the thickness d of a liquid crystal layer and the twist angle φ. Basically, $a_1$, $a_2$, $b_1$ and $b_2$ are two sets of independent parameters of the Stokes parameters $S_1$, $S_2$ and $S_3$. Consequently, determining the values of two sets of the Stokes parameters $S_1$, $S_2$ and $S_3$ enables the twist angle φ of the liquid crystal molecules and the thickness d of a liquid crystal layer to be calculated.

The twist angle of liquid crystal molecules and a thickness of a liquid crystal layer at a plurality of points on the liquid crystal display can be determined concurrently without deciding the orientation α at the light incident side of a liquid crystal display according to the following steps:

First, polarizing plate 15 disposed between liquid crystal display 14 and photodetector 17 is adjusted to polarize light parallel to the X axis. Liquid crystal display 14 is then optionally rotated to a position where the transmitted light intensity takes an extreme value (maximum or minimum) at each of a plurality of points on liquid crystal display 14. Then, the transmitted light intensity signal generated by photodetector 17 at the position is read to measure the transmitted light intensity Ix at each of a plurality of points on liquid crystal display 14. In this case, liquid crystal display 14 can be rotated to a position where the transmitted light intensity takes an extreme value at each of a plurality of points on liquid crystal display 14 and measure the transmitted light intensity at that position. However, the operation and processing loads will become very large. To avoid this problem, liquid crystal display 14 may be rotated to a position where the average or sum of the transmitted light intensity values detected at a plurality of points on the liquid crystal display takes the maximum or minimum value. The transmitted light intensity signal generated by photodetector 17 at such a position may be read to measure the transmitted light intensity Ix at each of the plurality of points on the liquid crystal display. In this case, if processor 18 outputs the calculated signals, for example, to a display unit for displaying the average or sum etc., of each of the transmitted light intensity values at a plurality of points on the liquid crystal display, the liquid crystal display can be easily rotated to a position where the transmitted light intensity takes an extreme value. In the alternative, software can be written for processor 18 to automatically determine the best position for liquid crystal display 14.

While liquid crystal display 14 is in a position where the transmitted light intensity takes an extreme value, polarizing plate 15 is adjusted so as to polarize light parallel to the Y axis. The transmitted light intensity signal generated by photodetector 17 at this time is then read to measure the transmitted light intensity Iy at each of a plurality of points on liquid crystal display 14.

Polarizing plate 15 is then adjusted to polarize light in a direction 45 degrees between the X and Y axes and the transmitted light intensity signal generated by photodetector 17 at that time is read to measure the transmitted light intensity I45 at each of a plurality of points on liquid crystal display 14.

While polarizing plate 15 is set to polarize light in the direction inclined by 45 degrees between the X and Y axes, quarter wavelength plate 16 is disposed between polarizing plate 15 and liquid crystal display 14 so as to incline its axial direction by 45 degrees from the polarizing direction of polarizing plate 15 (that is, along the Y axis). The transmitted light intensity signal then generated by photodetector 17 at that time is read to measure the transmitted light intensity Iq45 at each of the plurality of points on liquid crystal display 14.

The Stokes parameters $S_1$ to $S_3$ can be found by substituting the transmitted light intensity values Ix, Iy, I45, and Iq45 detected at each of a plurality points on liquid crystal display 14 as described above for equation (9). In addition, according to the calculated Stokes parameters $S_1$ to $S_3$, as well as equations (8), (6) and (3), the twisting angle φ and the thickness d of the liquid crystal layer can be determined concurrently for each of a plurality of points on liquid crystal display 14. Preferably, processor 18 performs all these calculations.

When the transmitted light intensity is measured at an extreme value for each of a plurality of points on liquid crystal display 14 as described above, photodetector 17 corresponds to a transmitted light intensity detecting apparatus.

It is also possible to use other methods for measuring the transmitted light intensity at each of a plurality of points on the liquid crystal display. For example, liquid crystal display 14 may be rotated by processor 18, and the transmitted light intensity is then read and stored at the position at liquid crystal display 14 and at each of a plurality of points on liquid crystal display 14 positioned there. The transmitted light intensity is then measured at a position where the average or the sum of the transmitted light intensity values for a plurality of points on liquid crystal display 14 becomes a maximum or minimum. Furthermore, it is also possible to adjust the polarizing direction of polarizing plate 15 and insert quarter wavelength plate 6 to measure the transmitted light intensity values Iy, I45 and Iq45 at each of a plurality of points on liquid crystal display 14. In this case, photodetector 17 and processor 18 correspond to a transmitted light intensity detecting apparatus, respectively. In addition, liquid crystal display 14 can be fixed and polarizing plates 13 and 15 can be rotated at the same time to measure the transmitted light intensity. In this case, the system coordinates may be rotated and measured concurrently.

The experiments of Samples 7 and 8 were performed at about 20° C. and the refractive indices of the liquid crystal E7 for ne and no are 1.761 and 1.528, respectively. According to measurement, the pre-tilt angle θs was chosen to be 0.5°.

SAMPLES 7 AND 8

Two sample liquid crystal displays, in particular a planar TN cell and a wedge TN cell, were prepared as follows: A polyvinyl alcohol (PVA) film was coated using a spin-coating method on transparent conductor film coated glass substrates as an orientation film. The surfaces of the substrates were then thermally treated and rubbed in one way to orient the liquid crystal molecules. The two substrates were aligned with glass fiber spacers and nematic liquid crystal E7 sealed therebetween. In the planar TN sample cell, 25 μm glass fiber spacer was used to set the cell thickness and the designed twist angle was about 60°.

The wedge TN cell was fabricated in a similar manner by overlapping two rubbed substrates with a designed twist angle of about 80°. 10 μm glass fiber spacer was placed at one side of the substrates and 20 μm glass fiber spacer was placed at the other side so the cell thickness linearly increased from one side to the other side.

The measurements for the planar TN cell were performed at an angle α of 30°. The incident light was linearly polarized parallel to the Y axis. The 2-D Stokes parameters were calculated using measured light intensities and the 2-D cell thickness and twist angle distributions were solved using the Stokes parameter equations provided above. The obtained measurement results were for a 0.4 mm×0.4 mm region. The average cell thickness and the twist angle in this region were almost constant, as expected. The average cell thickness was about 25.70 μm and the maximum difference of the cell thickness was about ±0.015 μm in this region. The average twist angle was about 60.56° and the maximum difference was about ±0.7°.

The measurements for the wedge TN cell were performed at an angle α of 45°. The incident light was linearly polarized parallel to the Y axis. The 2-D Stokes parameters were calculated using measured light intensities and the 2-D cell thickness and twist angle distributions were solved using the Stokes parameter equations provided above. The obtained measurement results again were for a 0.4 mm×0.4 mm region. As expected, the average twist angle in this region was almost constant, while the cell thickness increased linearly. The average cell thickness varied from 14.92 μm to 15.15, such that the slope of the cell thickness was about 0.00068 in this region. The average twist angle was about 79.56°.

Figure 6:
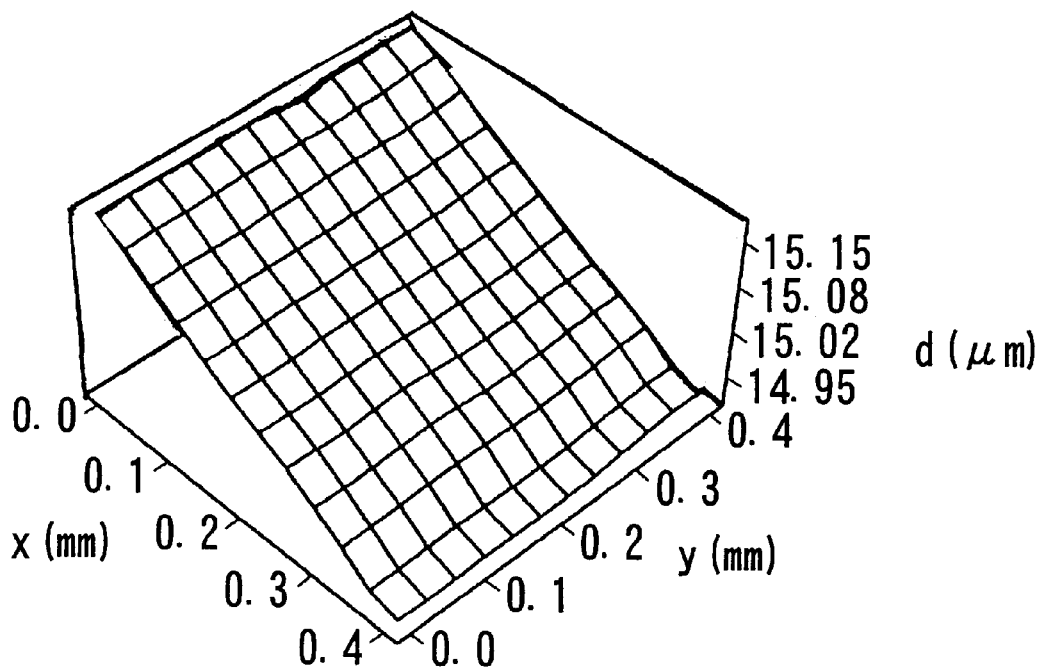
FIG. 6 is a two-dimensional distribution chart for thickness values of a liquid crystal display measured at a plurality of points using the second representative liquid crystal parameter detecting method.
Figure 7:
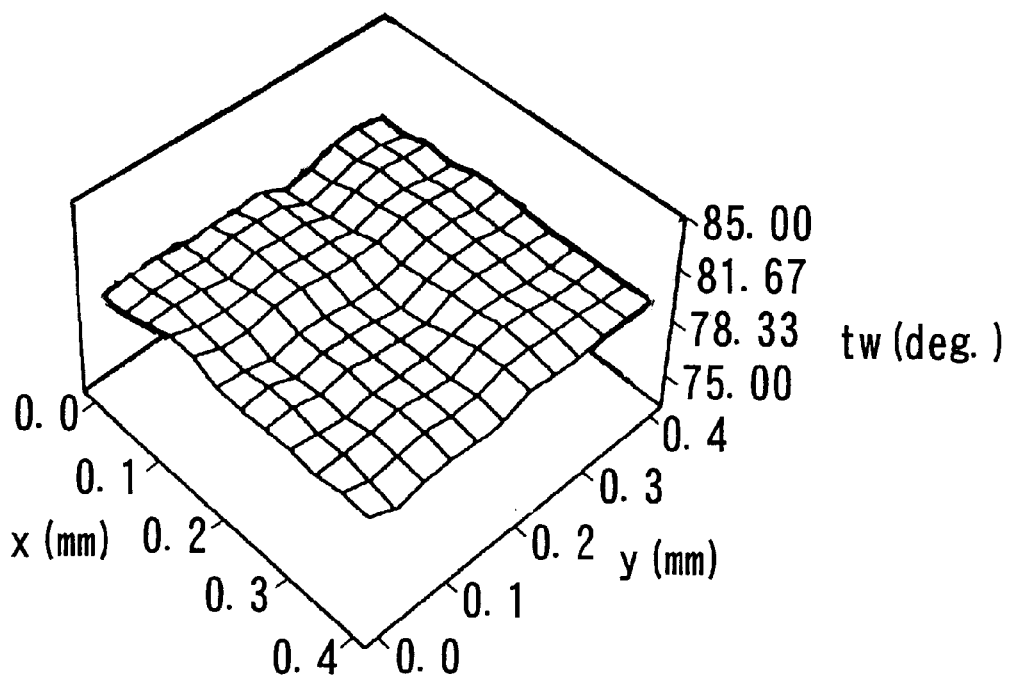
FIG. 7 is a two-dimensional distribution chart for twist angles of liquid crystal molecules measured at a plurality of points on the liquid crystal display using the second representative liquid crystal display parameter detecting method.

FIG. 6 shows a two-dimensional view of thickness values of the wedge liquid crystal layer and FIG. 7 shows a two-dimensional view of the twist angle φ of the liquid crystal molecules for the same display. Both of these representations were prepared using the above teachings by concurrently measuring light intensities at a plurality of points on the liquid crystal display. As shown in FIGS. 6 and 7, the quality of a liquid crystal display can be quickly, easily and accurately determined from a two-dimensional distribution chart. Thus, evaluating liquid crystal display panels can be efficiently performed using these teachings.

Those skilled in the art will recognize that the liquid crystal display parameter detecting apparatus and methods of the present invention are not limited to those representative embodiments shown in FIGS. 1 and 4.

Further, the methods and apparatus of the present disclosure are further discussed in the following references, which references are hereby incorporated by reference:

Zhan Han, He, Ying Zhou and Susumu Sato, "A Novel Method for Determining the Cell Thickness and Twist Angle of a Twisted Nematic Cell by Stokes Parameter Measurement," Jpn. J. Appl. Phys. Vol. 36(1997), pp. 2760–2764;

Zhan, He, Ying Zhou and Susumu Sato, "A Two-Dimensional Stokes Parameter Method for Determination of Cell Thickness and Twist Angle Distribution in Twisted Nematic Liquid Crystal Devices," Jpn. J. Appl. Phys. Vol. 37(1998), pp. 1982–1988; and Ying Zhou, Zhan He and Susumu Sato, "An Improved Stokes Parameter Method for Determination of the Cell Thickness and Twist Angle of Twisted Nematic Liquid Crystal Cells" Jpn. J. Appl. Phys. Vol. 37(1998), pp. 2567–2571.

What is claimed is:

1. A method for determining liquid crystal display parameters, comprising the steps of:

measuring light intensities transmitted by a liquid crystal display;

calculating liquid crystal display Stokes parameters based upon the intensities of the measured transmitted light; and determining at least one parameter selected from a thickness (d) of a liquid crystal cell and a twist angle (φ) of liquid crystal molecules based upon the liquid crystal display Stokes parameters.

2. A method as in claim 1, wherein the step of measuring the transmitted light intensities includes the steps of:

interposing a polarizing plate between the liquid crystal display and a photodetector in a direction of an X axis and measuring a transmitted light output Ix using the photodetector, interposing a polarizing plate between the liquid crystal display and a photodetector in a direction of a Y axis and measuring a transmitted light output Iy using the photodetector; and interposing a polarizing plate between the liquid crystal display and a photodetector in a direction of 45 degrees between the X and Y axes and measuring a transmitted light output I45 using the photodetector.

3. A method as in claim 2, wherein the step of calculating liquid crystal display Stokes parameters according to the measured transmitted light intensities from liquid crystal display is determined by the Stokes parameters $S_0$, $S_1$, and $S_2$ according to the following equations:

$S_0 = (Ix+Iy)/(Ix+Iy) = 1$
$S_1 = (Ix-Iy)/(Ix+Iy)$
$S_2 = [2(I45)-(Ix+Iy)]/(Ix+Iy)$.

4. A method as in claim 2, wherein the step of measuring the transmitted light intensities further includes the step of:

interposing a quarter wavelength plate between the polarizing plate, the polarizing direction of which is 45 degrees between the X and Y axes, and the liquid crystal display such that the polarizing direction of the quarter wavelength plate is at 45 degrees to the polarizing direction of the polarizing plate, and measuring a transmitted light output Iq45 using the photodetector.

5. A method as in claim 4, wherein the step of calculating liquid crystal display Stokes parameters according to the measured transmitted light intensities is determined by the Stokes parameters $S_0$, $S_1$, $S_2$ and $S_3$ according to the following equations:

$S_0 = (Ix+Iy)/(Ix+Iy) = 1$
$S_1 = (Ix+Iy)/(Ix+Iy)$
$S_2 = [2(I45)-(Ix+Iy)]/(Ix+Iy)$
$S_3 = -[2(Iq45)-(Ix+Iy)]/(Ix+Iy)$.

6. A method as in claim 1 wherein the measured transmitted light intensity is a maximum or minimum value for the liquid crystal display.

7. A method as in claim 6 further including a step of rotating the liquid crystal display to a position where the output of the photodetector takes a maximum or minimum value to measure the transmitted light intensities.

8. A method as in claim 1 wherein the intensity of light transmitted from the liquid crystal display is simultaneously or substantially simultaneously measured at a plurality of points on the liquid crystal display by measuring the transmitted light intensities with a two-dimensional photodetector.

9. A method as in claim 8 wherein the Stokes parameters are determined for the plurality of points on the liquid crystal display according to the transmitted light intensity measured for each of the plurality of the points on the liquid crystal display and at least one liquid crystal parameter is determined for each of the plurality of points on the liquid crystal display according to the Stokes parameters calculated for each of the plurality of points on the liquid crystal display.

10. A method as in claim 9, wherein the step of measuring the transmitted light intensity at a plurality of points on the liquid crystal display includes the steps of:

interposing a polarizing plate between the liquid crystal display and a two-dimensional photodetector in a direction of an X axis and measuring a transmitted light output Ix using the photodetector;

interposing a polarizing plate between the liquid crystal display and a two-dimensional photodetector in a direction of a Y axis and measuring a transmitted light output by using the photodetector; and interposing a polarizing plate between the liquid crystal display and a two-dimensional photodetector in a direction of 45 degrees between the X and Y axes and measuring a transmitted light output I45 using the photodetector.

11. A method as in claim 10, wherein the step of calculating liquid crystal display Stokes parameters according to the measured transmitted light intensities for the plurality of points on the liquid crystal display is determined by the Stokes parameters $S_0$, $S_1$, and $S_2$ according to the following equations:

$S_0=(Ix+Iy)/(Ix+Iy)=1$
$S_1=(Ix-Iy)/(Ix+Iy)$
$S_2=[2(I45)-(Ix+Iy)]/(Ix+Iy)$.

12. A method as in claim 10, wherein the step of measuring the transmitted light intensities further includes the steps of:

interposing a quarter wavelength plate between the polarizing plate, the polarizing direction of which is 45 degrees between the X and Y axes, and the liquid crystal display such that the polarizing direction of the quarter wavelength plate is at 45 degrees to the polarizing direction of the polarizing plate, and measuring a transmitted light output Iq45 using the photodetector.

13. A method as in claim 12, wherein the step of calculating the liquid crystal display Stokes parameters for each of the plurality of points on the liquid crystal display according to the transmitted light intensity measured at each of the plurality of points on the liquid crystal display is determined by the Stokes parameters $S_0$, $S_1$, $S_2$ and $S_3$ according to the following equations:

$S_0=(Ix+Iy)/(Ix+Iy)=1$
$S_1=(Ix-Iy)/(Ix+Iy)$
$S_2=[2(I45)-(Ix+Iy)]/(Ix+Iy)$
$S_3=-[2(Iq45)-(Ix+Iy)]/(Ix+Iy)$.

14. A method as in claim 13 wherein the measured light intensities are a maximum or minimum value for the liquid crystal display.

15. A method as in claim 14 further including a step of rotating the liquid crystal display to a position where the output of the two-dimensional photodetector takes a maximum or minimum value to measure the light intensities.

16. An apparatus for detecting liquid crystal display parameters, comprising:

means for measuring light intensities transmitted by a liquid crystal display;

means for calculating liquid crystal display Stokes parameters based upon the intensities of the measured transmitted light; and means for determining at least one parameter selected from a thickness (d) of a liquid crystal cell and a twist angle ($\phi$) of liquid crystal molecules based upon the liquid crystal display Stokes parameters.

17. An apparatus as in claim 16 wherein the means for measuring light intensities comprises:

a light source;

a photodetector;

a first polarizing plate disposed between the light source and the liquid crystal display; and a second polarizing plate disposed between the liquid crystal display and the photodetector.

18. An apparatus as in claim 17 wherein the means for measuring light intensities further comprises:

a quarter wavelength plate removably disposable between the liquid crystal display and the second polarizing plate.

19. An apparatus as in claim 18 wherein the means for calculating liquid crystal display Stokes parameters and the means for determining at least one parameter comprise a processor, wherein the processor calculates the Stokes parameter according to signals generated by the photodetector when the intensity of light transmitted by the liquid crystal display takes an extreme value and determines a parameter selected from the thickness (d) of a liquid crystal layer and the twist angle ($\phi$) of the liquid crystal molecules according to the calculated Stokes parameters.

20. An apparatus as in claim 16 wherein the means for measuring light intensities transmitted by a liquid crystal display can simultaneously, or substantially simultaneously, measure light intensities for a plurality of points on the liquid crystal display.

21. An apparatus as in claim 20 wherein the means for measuring the plurality of light intensities comprises:

a light source;

a two-dimensional photodetector;

a first polarizing plate disposed between the light source and the liquid crystal display;

a second polarizing plate disposed between the liquid crystal display and the photodetector.

22. An apparatus as in claim 21 wherein the two-dimensional photodetector is a CCD array.

23. An apparatus as in claim 21 wherein a processor inputs transmitted light intensities from the two-dimensional photodetector for each of the plurality of points on the liquid crystal display concurrently, determines a Stokes parameter for each of the plurality of points on the liquid crystal display according to the inputted, transmitted light intensity for each of the plurality of points on the liquid crystal display, and determines at least one parameter according to the Stokes parameters calculated for the plurality of points on the liquid crystal display.

24. An apparatus as in claim 23, wherein the processor simultaneously, or substantially simultaneously, inputs transmitted light intensities display at extreme values from the two-dimensional photodetector for each of the plurality of points on the liquid crystal.

25. An apparatus as in claim 24, wherein the two-dimensional photodetector is a CCD array.

26. An apparatus as in claim 24, wherein the processor simultaneously, or substantially simultaneously, inputs transmitted light intensities display at extreme values from the two-dimensional photodetector for each of the plurality of points on the liquid crystal, while the liquid crystal display is rotated to a position where the average of the two-dimensional photodetector at a plurality of points on the liquid crystal display takes an extreme value.

* * * * *